Jan. 15, 1929.  H. E. WARREN  1,699,128
CONTROL OF DISTANT POWER STATIONS
Filed May 28, 1926  3 Sheets-Sheet 1

Fig. 1.

Inventor
Henry E. Warren,
by [signature]
His Attorney.

Jan. 15, 1929.

H. E. WARREN

1,699,128

CONTROL OF DISTANT POWER STATIONS

Filed May 28, 1926   3 Sheets-Sheet 2

Inventor
Henry E. Warren,
by
His Attorney.

Jan. 15, 1929.   1,699,128

H. E. WARREN

CONTROL OF DISTANT POWER STATIONS

Filed May 28, 1926   3 Sheets-Sheet 3

Fig. 8.

Inventor
Henry E. Warren,
by [signature]
His Attorney.

Patented Jan. 15, 1929.

1,699,128

UNITED STATES PATENT OFFICE.

HENRY E. WARREN, OF ASHLAND, MASSACHUSETTS, ASSIGNOR TO GENERAL ELECTRIC COMPANY, A CORPORATION OF NEW YORK.

CONTROL OF DISTANT POWER STATIONS.

Application filed May 28, 1926. Serial No. 112,392.

In the generation and distribution of electric energy it oftentimes becomes desirable to supply the same distribution system by more than one generating unit and by power stations located at widely different points and to tie together different distribution systems each having its own power generating apparatus. The modern tendency toward superpower systems oftentimes supplied by both water and steam generating stations makes it increasingly important to have some way of automatically controlling the larger number of units in a power station or a number of distant power stations which supply the system so that each unit or power station or both will carry its proper share of the load without disturbing the voltage or the frequency where the system is of the alternating class. Exact synchronism must be maintained of course between all synchronous generating apparatus supplying the same alternating current system. It is difficult, if not impossible, to independently adjust the governing apparatus of a large number of prime movers of different sizes and types so that, as the load on the system supplied thereby rises and falls, each prime mover in service will always carry its proper share of the load. Some of the governors will generally be more sluggish and less sensitive than others which will be reflected by a constantly changing distribution of the load. This is undesirable not only because some apparatus may become overloaded while other apparatus is underloaded, but also because it has a disturbing influence on the voltage and frequency of the system. It is especially undesirable where an alternating current system is used as a timing system supplying secondary timing devices driven by synchronous motors, because then it is essential that the frequency be maintained at some predetermined constant average value.

It is possible to automatically control the frequency of a power generating unit which is subject to a varying load so as to maintain the average frequency at some predetermined value. Such a system is described in my Patent No. 1,505,925 in which a differential master clock is used for biasing the governor of the prime mover which drives the generating apparatus. This is satisfactory where the regulated unit supplies a substantial portion of the power of a distribution system, but it is readily seen that in an extensive distribution system supplied at many points by different generating plants, it would not be feasible to attempt to accurately regulate the system frequency from one unit or one plant alone, since if this were attempted a substantial portion of the variation in load on the whole system would fall on the regulated unit or plant.

It is the primary object of my invention to provide a system for similarly regulating a number of different electric generating units located at the same or different points in a manner to overcome the difficulties above mentioned.

In carrying my invention into effect I prefer to use a single master clock regulator of suitable construction such as that described in my Patent No. 1,505,925 and to regulate the various power units therefrom. Where the units to be regulated are a considerable distance apart the regulation may be accomplished through high frequency signaling apparatus, in general, similar to that employed for carrier current and radio applications.

The features of my invention which are believed to be novel and patentable will be pointed out in the claims appended hereto. For a better understanding of my invention, reference is made in the following description to the accompanying drawings in which

Figure 1:
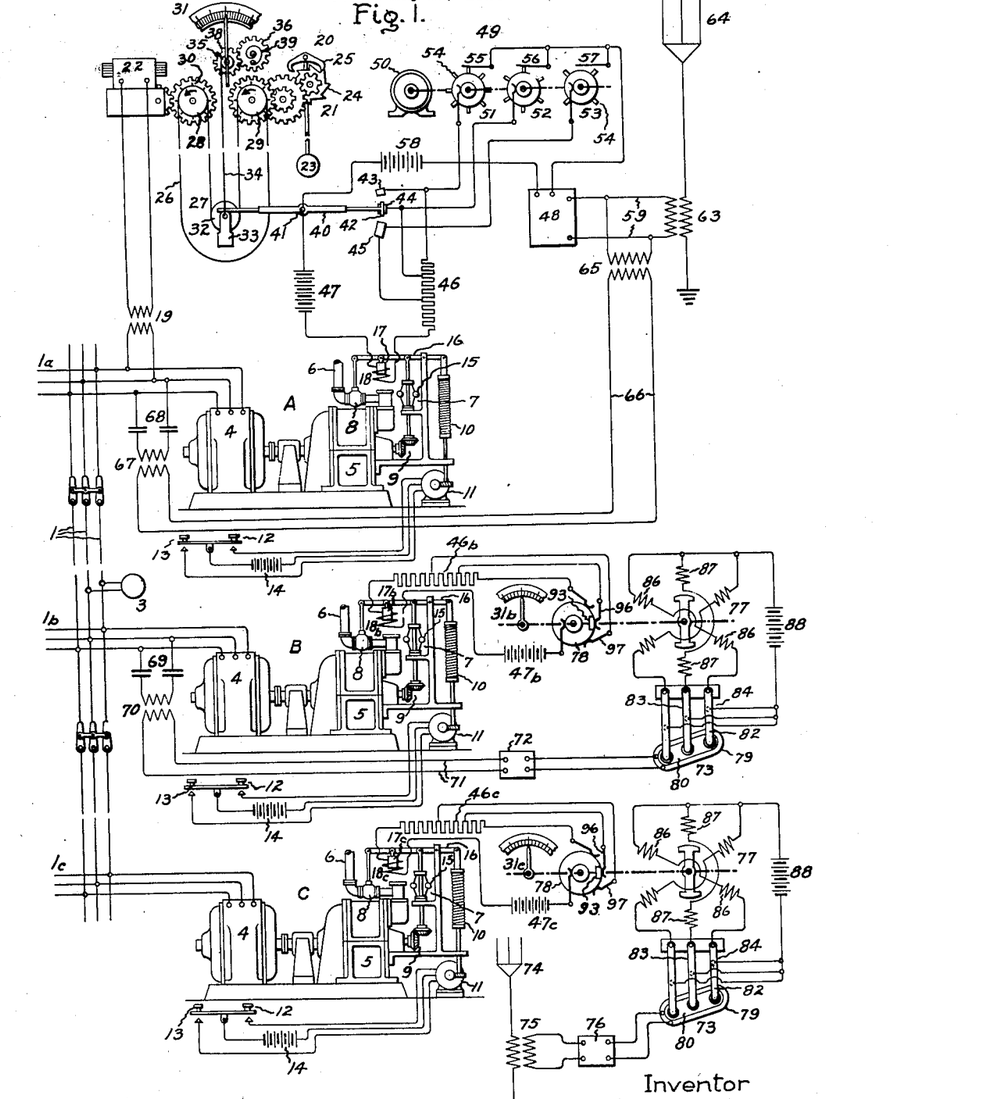
Fig. 1 represents the essential elements of an alternating generating system to which my invention is applied to simultaneously regulate the generating apparatus at separate plants A, B and C, station A being regulated directly, station B by carrier current control, and station C by radio from the same master clock controller.

Referring to Fig. 1, A, B and C represent alternating current generating stations located at different points which will be considered many miles apart. The alternating current generators 4 at these various stations will be considered as synchronous generators, the direct current exciters and exciter connections being omitted in order not to crowd the drawing. The motors 5 for driving these generators are represented as steam turbines but may be of any other type. The three power stations supply a common alternating current distribution system represented at 1. While I have here shown only three power stations, each with a single turbo-alternator for the sake of simplicity, I desire to have it understood that any number of stations, each having a plurality of generating units, may be controlled in the manner hereinafter explained.

Station A is controlled directly by a master clock regulator of a suitable construction such as that described in my Patent No. 1,505,925, so as to maintain the frequency constant at some predetermined average value. This master clock regulator also controls a high frequency signaling apparatus indicated at 49 from which signals are sent out by carrier current or radio, or both, to similarly control the other power stations. The apparatus is designed so that it may be installed to control existing power generating apparatus. For instance, the three power stations A, B and C may be stations which were previously supplying isolated systems such as 1ª, 1ᵇ and 1ᶜ, which systems have now been interconnected, making it desirable to employ the control system of this invention. Secondary clocks, or other timing devices, may be connected to the distribution system, as represented at 3. The turbo-alternators at stations A, B and C and their speed governors will, for the sake of simplicity, be considered to be similar and that at station A, with its master clock regulator, will now be described in detail.

In the present case I have shown this prime mover to be a turbine 5 having a source of fluid supply conducted thereto through the pipe 6. The turbine is provided with the usual speed-governing device indicated in general at 7 which controls the throttle valve 8. The governor is driven from the turbine shaft in the usual manner by means of gearing 9. The setting of the governor is adapted to be manually adjusted by a spring 10. The adjustment of the spring may be effected by a small electric motor 11 controlled from a distant point as, for example, the switchboard of the power station, in a well known manner for the purpose of attaining remote speed control over turbines. Such means is indicated by the keys 12 and 13 which when closed on their corresponding contacts energize the motor 11 from a battery 14 to drive the motor in one direction or the other and correspondingly adjust the setting of the governor to raise or lower the turbine speed.

The centrifugal element 15 of the governor actuates a lever 16, the outward radial movement of the centrifugal device tending to lower the left-hand end of the lever 16, as the speed of the turbine increases, to close the throttle valve 8, this tendency being opposed by the adjustable spring 10. Attached to the same lever 16 is a soft iron core 17 located in the axis of a solenoid 18. The core 17 is perfectly free to move within the solenoid and does not interfere in any way with the action of the governor so long as the solenoid is not energized and even when the solenoid is energized does not interfere with the free movement of the governor, but only serves to bias it.

The master clock speed-regulating device is indicated in general at 20. The regulating apparatus 20 is dependent for its action upon the comparison of the speed of generator 4 and a standard timepiece indicated at 21 which has been accurately adjusted. The speed of the turbo-driven alternator 4 is duplicated in the control apparatus 20 by means of a small synchronous motor 22 adapted to be supplied from a transformer 19 and here shown as a self-starting synchronous type, such as shown, for instance, in various Letters Patent granted to me, Nos. 1,283,432, 1,283,433, 1,283,435, and 1,390,320. The standard timepiece in this instance comprises essentially a pendulum 23, escapement wheel 24, and pawl 25. In order to compare the speeds of the synchronous motor 22 and the standard timepiece, I make use of an endless flexible member such as a belt or chain 26, having a loop 27 therein and adapted to be driven at one point by means of the synchronous motor 22 and at another point is adapted to be advanced in accordance with the speed of the standard timepiece. By appropriate gearing the belt or chain 26, which is made of such flexible material as a steel strip or of links, and which is prevented from slipping over the driving pulleys 28 and 29 by means of pins 30 engaging the belt or chain, is allowed to be advanced by the standard timepiece at the same rate as it is being driven by the synchronous motor 22, when the speed of this motor is at the correct value. In this way the length of the loop 27 stays constant, provided the speed of the turbo-alternator 4, is at the proper value, and this length furthermore may be used as an indication of the accumulated excess in time of the secondary clocks over the indication of the standard timepiece, or vice versa. Such indicating means is shown above the standard timepiece at 31. This indicating mechanism is described and claimed in my Patent No. 1,420,859, June 27, 1922, entitled "Time indication apparatus". I have not shown the indicating apparatus actuated by the standard timepiece, but it is evident that hands and a dial may be provided for this purpose. It is also evident that should the average frequency vary, the length of the loop 27 as measured from corresponding points at the driving pulleys 28 and 29 would vary from normal and this would show a non-coincidence of indications of the secondary clock and of the standard timepiece. It is furthermore evident that other means for duplicating the motion of the alternator 4 in the apparatus 20 may be utilized for moving the endless flexible member 26 instead of the synchronous motor 22, but the means I have shown is advantageous when it is desired to have the regulating apparatus at a considerable distance from the central station, since by this means actual mechanical connection between the alternator 4 or the turbine 5 and regulating apparatus 20 is obviated. The direction of rotation of the synchronous motor 22 and of the shaft driven or advanced by the standard timepiece are, in the given illustration, such that the loop lengthens when the synchronous motor 22 stops or rotates too slow. The proper direction of rotation of the driving pulleys 28 and 29 is shown by the arrows thereon. With this arrangement it is not essential to use a spring for keeping the pendulum going, since the requisite energy for doing this may be obtained from motor 22 through the mechanical connection between the motor and the timepiece.

Located within the loop 27 is the sheave 32 which may act at a weight or, if this be insufficient, an extra weight or movable member 33 may be added. This weight serves to keep the pendulum going even after an interruption in the service because it descends and gives up its potential energy to the pendulum through the intermediate mechanical connection. As shown in my prior patents referred to above, the motor 22 has an irreversible drive somewhere in its train of gears, such as a worm and wheel, whereby it is impossible for the movable member or link 26 to rotate the motor backwards when the motor stops. It is evident that the length of the loop 27 as well as the position of the movable member 33 is a function of the average error in frequency of the distribution system. I utilize this variation in length for performing the regulating functions. As above referred to, I may also in addition employ an indicator 31 for indicating the average error in frequency of the distribution system. In this case the pointer of indicator 31 is moved in response to variations in length of the loop 27 by means of a flexible connection or cord 34 joined at one end to the axle of the sheave 32 and at the other end to a drum 35 which carries the pointer of of the indicator 31. In order to keep the flexible element taut at all times a spring take-up is utilized comprising a spur gear 36 loosely mounted on the stationary shaft 37, together with a spur gear 38 rigidly fastened to the drum 35 upon which the flexible member 34 is wound. Rigidly fastened at its inner end to the shaft 37 is a helical spring 39 of comparatively light construction. The outer end of this spring is fastened to the gear 36. It is evident that this helical spring 39 acts to stretch the member 34 at all times.

As has been stated heretofore, the variation in length of the loop 27 may be utilized in any well known manner for effecting the regulation of the speed of the turbine 5. In this instance the rise and fall of the movable member 33 is made use of to make and break electrical contacts. For this purpose I show a member 40 adapted to be tilted to perform this function. The member 40 is pivoted at 41 and has one end resting upon the movable weight 33 so as to be rotated about pivot point 41 as the weight moves up and down. The opposite end carries a contact which cooperates with a number of stationary control contacts 43, 44 and 45. These stationary contacts are connected to various points of a resistance 46. The resistance is associated with a circuit containing solenoid 18, a source of supply 47 and the movable contact 42 so that, as the contact 42 moves, it varies the current flowing in solenoid 18 and biases the governor of turbine 5 accordingly. The movable contact 42 is wide enough to bridge across between any two stationary contacts so as not to open the circuit when passing from one contact to another. As represented in the drawing, the movable contact 42 rests upon the center stationary contact 44 giving an average biasing effect on the governor tending to close the throttle valve. If now the speed is too fast, weight 33 will raise until another section of the resistance 46 is cut out by contact 42 passing onto contact 45. If, on the other hand, the speed is too low, weight 33 will be lowered and more resistance will be inserted by contact 42 passing onto stationary contact 43. This tends to open the throttle valve slightly. If the speed is still too low, the solenoid circuit will be opened entirely. As many contacts and as many steps in the control may be had as is desired. Under average conditions the adjustment will be such that the apparatus will remain near the center of its control range while extreme positions will be utilized only occasionally to correct more serious errors. The governor setting should be such that when the solenoid is deenergized the speed will be slightly high and when fully energized the speed will be slightly low. It is evident that this device will detect variations in frequency or speed which are too small to be detected and corrected by the ordinary operation of the contrifugal governor. The direct regulation thus accomplished is more fully set forth and claimed in my Patent No. 1,505,925, and need not be further explained here.

If the turbo-alternator at station A is only one of a large number of generating units supplying the alternating current distribution system and represents only a small part of the total generating capacity, it will be readily appreciated that the regulation of this unit by the master clock, as above described, will tend to throw the variation in load of the entire system on this particular unit. At times of heavy load the unit will be overloaded without being able to maintain the system frequency up to its proper value while at times of light load the regulated unit will be unable to prevent the system frequency from exceeding its proper value. Under such circumstances, this arrangement alone will not suffice either to equalize the load distributed or to maintain the average error in frequency of the system to a negligible value. What is needed is the same kind of regulation on all the units or stations, or at least a sufficient number of them so that the regulation will predominate to maintain the desired system frequency and at the same time maintain an equitable distribution of the load. To accomplish these objects, I might provide a master clock regulator at each station similar to that shown at station A and then provide means for accurately maintaining the standard timepieces in exact synchronism. I prefer however to provide a single differential master clock regulator and control all the units or stations therefrom simultaneously in the manner now to be described.

Figure 2:
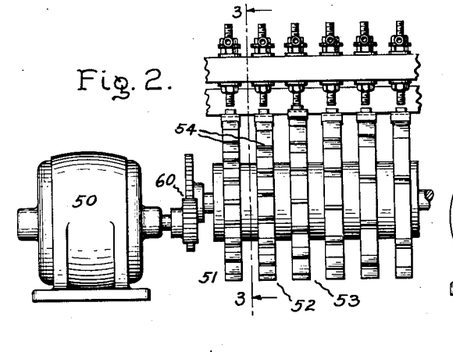
Fig. 2 represents a selective signaling device employed at the sending station.
Figure 3:
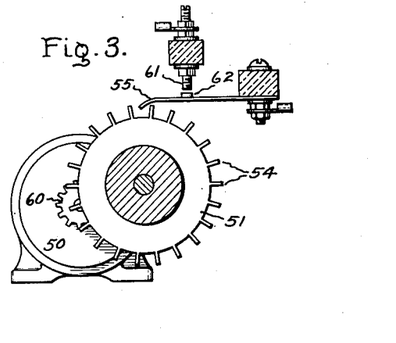
Fig. 3 is a sectional view taken on line 3—3 of Fig. 2.

Associated with the master clock regulator at station A is high frequency signaling apparatus comprising a high frequency generator and modulator represented at 48 of any of the usual types common in radio applications capable of accomplishing the desired result. The high frequency signaling current generated by this apparatus is modulated in accordance with lower frequency impulses generated by the rotary contact device represented at 49 in accordance with the position of the contact arm 40 of the master clock regulator. The rotary contactor comprises a constant speed motor 50 which drives a plurality of toothed wheels 51, 52, 53 having different numbers of teeth 54 projecting from their peripheries. These teeth close or control the closure of contactors 55, 56 and 57 in circuits including stationary contacts 43, 44 and 45 respectively of the master clock regulator, the movable contact 42, a source of supply 58, and the modulating circuit of the apparatus 48. Thus when contact 42 is closed on contact 44 modulating current impulses are generated having a frequency corresponding to the number of teeth in wheel 52. These low frequency impulses are superimposed on the high frequency sending current and the modulated high frequency current is impressed upon the outgoing circuit 59 of the apparatus 48. When contact 42 bridges contacts 43 and 44, the apparatus sends out signals modulated in accordance with the number of teeth in wheel 52 and also in wheel 51. The modulating frequencies are selected so that the receiving apparatus at the receiving stations will distinguish between them. When contact 42 rests on contact 43 alone, wheel 51 will alone be active to transmit the signals, and so on. The modulator 49 may be constructed as shown in Figs. 2 and 3. Here the shaft carrying the toothed wheels is geared to the motor, as at 60. 61 and 62 represent the contacts in the modulating circuit operated by the contact arm 55. The number of wheels and modulating frequencies will of course be the same as the number of contacts controlled by the master clock regulator and in the detail drawing six such wheels have been shown. The high frequency signals thus produced may be transmitted to the receiving stations by radio through the transformer 63 and antenna 64, or by carrier currents through the transformer 65, circuit 66, transformer 67, condenser coupling 68, over the power circuit 1. Both methods are shown, that for station B being by carrier current and that for station C by radio. At station B the carrier current is taken from the distribution system 1 through a condenser coupling 69, transformer 70 and circuit 71, to a suitable amplifying apparatus 72, and the amplified signaling current is then impressed on a receiver 73. At station C the high frequency signals are received through the antenna 74, transformer coupling 75 and amplifier 76, and pass then to the receiver 73. The remaining apparatus at stations B and C may be similar and comprise the selective receiver 73 already mentioned, the selector motors 77, and the selector switches 78, which control the currents flowing in the circuits of biasing solenoids $18^b$ and $18^c$ similar to the circuit of solenoid 18 at station A.

Figure 5:
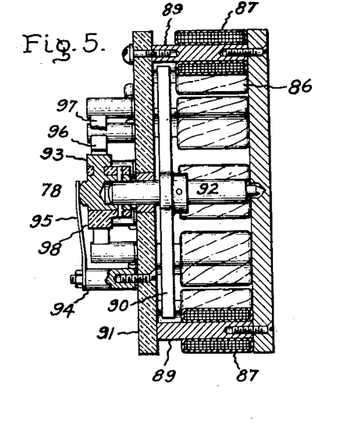
Fig. 5 is a sectional view taken on line 5—5 of Fig. 4.
Figure 6:
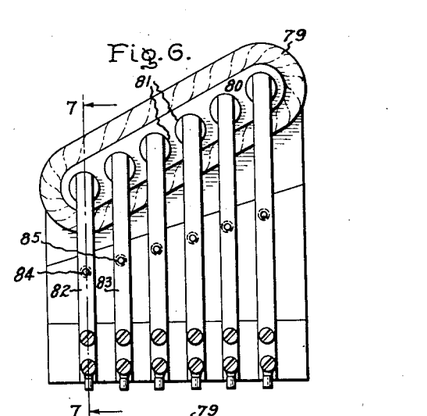
Fig. 6 is a high frequency signal receiving device employed with the selector switch and motor at the receiving stations.
Figure 7:
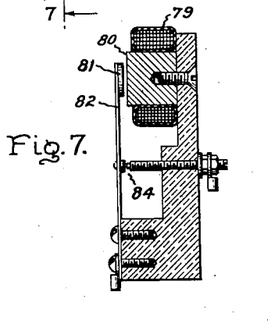
Fig. 7 is a sectional view taken on line 7—7 of Fig. 6.

The details of the receiver are represented in Figs. 6 and 7. It comprises a coil 79 surrounding a core 80. Opposite to the core are a number of armatures 81 carried by vibratory reeds 82, 83, corresponding in number to the number of wheels 51, 52, etc. of the signal sending apparatus at station A. These reeds are of different lengths and are adjusted to have natural periods of vibration corresponding respectively to the different frequencies of the modulating currents produced by the wheels 51, 52, etc. so that when contacts 42 and 44 of the master clock regulator at station A close the modulating circuit through the contacts vibrated by wheel 52 for example, only that reed 83 of the receiving device, which is tuned to this frequency, will vibrate. If contact 42 bridges contacts 43 and 44 at station A, so that both wheels 51 and 52 are effective, corresponding reeds 82 and 83 at the receiving stations will vibrate, etc. When a reed is vibrating it closes contacts represented at 84. These contacts control the various circuits of the selector motors represented in detail in Figs. 4 and 5. These motors have pairs of diametrically arranged coils 86, 87, etc., connected in series with each such set of contacts 84, 85, etc., through a source of supply 88. Thus coils 87 are connected in series with source 88 and vibratory contacts 85 of vibratory reed 83 and coils 88 are connected in series with source 86 and vibratory contacts 84. The coils 86, 87, etc. are wound on core pieces 89 which project beyond the coils and form a circular stator member with which a revolving magnetic bar armature 90 cooperates. When any pair of diametric coils are energized the armature 90 turns to that position and when two sets of adjacent reeds are vibrating so as to energize two sets of adjacent pairs of coils the armature 90 takes up a central position between them. This is a common form of motor and need not be further described.

Figure 4:
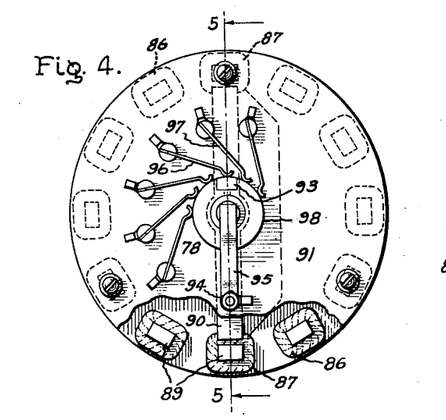
Fig. 4 is a selector control switch and motor employed at the receiving stations.

The motor rotates the switching device 78 which, as shown in Figs. 4 and 5, is preferably built integral with the motor on an insulating cover 91. The shaft 92 of the motor carries an insulated contact 93 electrically connected to a binding post 94 through a spring brush 95. The contact 93 forms a sector in the insulating hub 98 upon the outer surface of which rest a plurality of brushes 96, 97, etc. equal in number to the vibratory reeds and positioned so as to selectively make contact with the segment 93 as the motor rotates. The segment is wide enough to bridge two of the brushes when passing from one to the other so as not to open the circuit of the solenoid which is controlled thereby. At station A binding post 94 is connected through a source of supply 47$^b$ and the solenoid coil 18$^b$ to the resistance 46$^b$ and the brushes 96, 97, etc. are electrically connected to various taps in the resistance 46$^b$. The positions of the brushes 96, 97, etc. and their connections to the taps of the resistance 46$^b$ are such that the current in solenoid 18$^b$ is regulated in the same manner as the current in solenoid 18 is regulated directly by the master clock at station A. The apparatus at station C is arranged at station B, corresponding parts being designated by similar reference characters or by similar reference characters followed by the letter designation of the station. Indicators 31$^b$ and 31$^c$ are provided at stations B and C which give the same general information as that given by indicator 31 at station A and assist the operators at the various stations in adjusting the apparatus as well as serving to keep the operators informed as to the average error in frequency within the operating range.

For the sake of simplicity only three steps in the control range are represented in Fig. 1, but it will be understood that as many more steps as are needed may be used in practice. Also, that while I have represented only one station controlled by carrier current and only one controlled by radio, I desire to have it understood that all may be controlled by either method and that as many stations and as many generating units in each station as seem desirable in any particular distribution system may be thus controlled simultaneously from a single master clock regulator.

In initially installing the apparatus and from time to time as the load conditions change, some adjustment of the governor control springs may be necessary or desirable such that each unit in service will carry its proper share of the load at the rated speed with substantially the same adjustment of the biasing means. Also some difference in the adjustments of the resistance tap and of the total amount of resistance used may be found necessary in the circuit of solenoids 18, 18$^b$ and 18$^c$ to take care of slight differences in the operating characteristics of the governors. When these adjustments have been made all of the units provided with the control apparatus herein described will be simultaneously and similarly controlled from the single master clock regulator, thereby maintaining the load distribution as it should be and maintaining the actual frequency substantially constant and the average error in frequency on the system at a negligible value. The load distribution may be changed at any time by relative adjustment of the governor control springs.

The operation of the system as a whole will now be briefly reviewed. At station A the master clock regulator continuously measures the average error in frequency and moves arm 40 to the regulating position necessary to correct for any such error. As shown the position of arm 40 closes contacts 42 and 44. This sends a certain amount of current through solenoid 18 giving the governor a slight bias toward a closed position in this case. Simultaneously wheel 52 causes low frequency impulses of a certain frequency to be superimposed on the high frequency generated at 48 and this modulated current wave is sent out and received at stations B and C causing reeds 83 to vibrate. This energizes coils 87 of the selector motors and rotates section 93 into contact with brushes 96 which closes the solenoid circuits 18$^b$ and 18$^c$ through the taps of their resistances 46$^b$ and 46$^c$ corresponding to the tap of the resistance 46 closed at station A by contact 42. All the governors are thus simultaneously adjusted in the same direction and to the same extent. A change in the position of arm 40 will produce simultaneous and similar changes in all of the governor biasing means. Controlled generating units may be connected to or taken off the system from time to time in the usual way, as the load conditions warrant, without interfering with the remaining units on the system and without any particular attention being given to the high frequency control apparatus which may be provided with such units. If desired these devices may be left on all the time without injury irrespective of whether or not the corresponding unit is in operation and is left on, will serve to operate the indicators 31$^b$, etc. The circuit of the solenoid 18$^b$ itself may be opened to save the consumption of energy without interfering with the operation of the indicator 13$^b$. It will also be evident that it will be perfectly feasible to have some generating units connected to the system without being provided with the master clock control feature herein described. If for any reason it is desired to increase or decrease the frequency of the system temporarily without regard to the average error in frequency it may be done by simply manually adjusting the pivoted lever 40. This may be desirable where the system above described is to be synchronized and connected to another large system.

In describing the governor biasing means an arrangement has been described whereby the throttle is biased toward a closed position. The biasing means may be arranged to perform the opposite biasing function, or biasing functions, in both directions as explained in my Patent No. 1,505,925.

Figure 8:
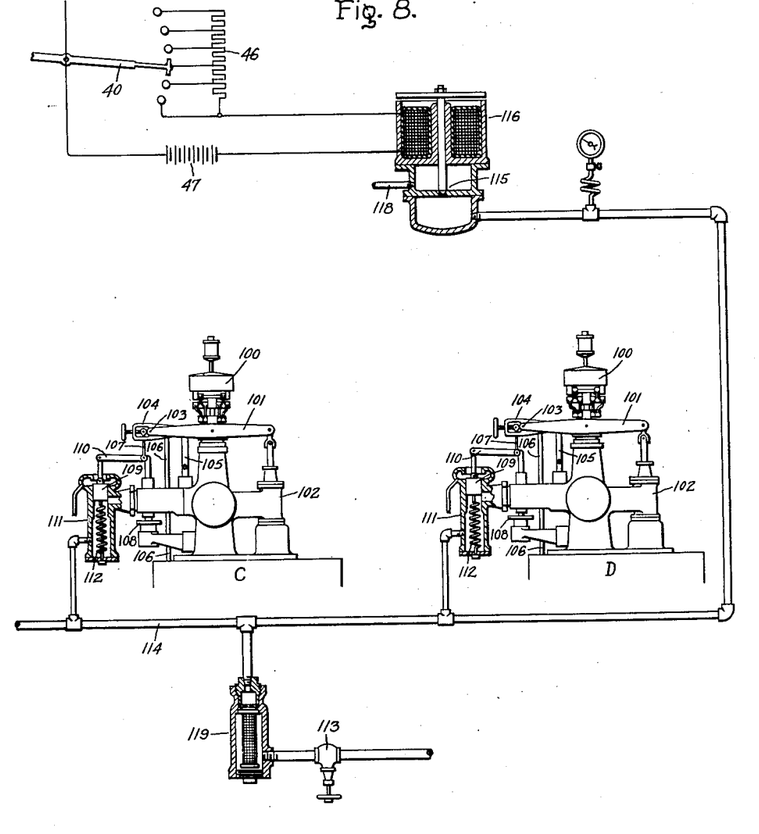
Fig. 8 illustrates the application of my invention to the regulation of a plurality of units in the same station.

In Fig. 8 I have represented the application of my invention to a plurality of prime movers C, D etc. in the same station. These prime movers may be considered as water turbines where only the essential parts of the governing apparatus of such prime movers are represented.

In the type of governor here shown a centrifugal governor 100 moves a lever 101 up and down as the speed increases or decreases. This controls a valve represented at 102 which in turn controls the gate motor of the turbine to open or close the gates which supply water to the turbine. The lever 101 is fastened to the movable portion of the centrifugal governor in such a way as to move the lever up when the speed increases and vice versa. Lever 101 is pivoted at 103 to a floating lever 104. The floating lever 104 is fastened at one end to a dash-pot piston rod 105 at an intermediate point to a rod 106 which connects with the gate opening mechanism of the turbine in such a manner as to provide a follow-up device and at the other end to the adjustable fulcrum rod 107. The vertical position of the rod 107 may be adjusted by a hand-wheel 108, or by a spring opposed hydraulic plunger 109. It will be evident that such vertical adjustment will vary the speed setting of the governor. Thus raising the rod 107 will lower the speed and vice versa. With the exception of the spring opposed plunger 109 and its connection to the governing mechanism, the governor is of a well known type and need not be further explained since its details constitute no part of the present invention.

The rod 107 is pivoted to a cross-link 110 one end of which is adapted to be adjusted up and down by the hand-wheel 108 and the other end by plunger 109. Plunger 109 is adapted to be drawn downward in a cylinder 111 by a spring 112. However, such movement is opposed by reason of oil pressure in the cylinder below the piston. This oil pressure is supplied from a suitable pressure source through a valve 113 and a screen chamber 119 and is conveyed to the cylinders 111 of the various governing units by the common supply pipe 114. The pressure on the supply side of valve 113 may be assumed to be constant. The pressure in the pipe 114 may be varied however by means of a relief valve 115 controlled by an electric relay 116 in response to the extent of energization of its coil. Thus, when the coil is fully energized from a source 47, the valve 115 is maintained closed so that no oil can escape to the outlet pipe 118 and when more or less of the resistance 46 is inserted in the energizing circuit of the relay coil more or less of the oil will escape and release the pressure in pipe 114 a corresponding amount. In this way the governor setting of all of the units C, D, etc., may be adjusted simultaneously and to the same extent. The resistance 46 is adjusted by the lever 40 which may be controlled directly by the master clock regulator of Fig. 1 in response to frequency variations of an alternating current distribution system supplied by the units C, D, etc., or indirectly through a high frequency signaling system such as has been previously described. It will be evident that the result of inserting resistance in the circuit of relay 116 is to increase the pressure in pipe 114, produce an upward adjustment of rod 107 and the left end of the governor lever 101, and a downward adjustment of the right-hand end such as to lower the speed setting of the governing mechanism. The manual adjustments of the various governors may of course be such as to distribute the load as desired, but the automatic control of all of the units allows variations in load to be distributed between all the units thus controlled in the proper manner, as hereinbefore described. It is quite evident that the types of governing devices shown in Figs. 1 and 8 may be controlled by a single master clock in some one of the ways described so that the same distribution system may be supplied at various points by steam and water power driven generating units while automatically maintaining any desired load distribution between such units as the load on the system varies.

In accordance with the provisions of the patent statutes I have described the principle of my invention together with the apparatus which I now consider to represent the best embodiment thereof but I desire to have it understood that the apparatus shown and described is only illustrative and that the invention may be carried out by other means.

What I claim as new, and desire to secure by Letters Patent of the United States, is:

1. An electric distribution system, a plurality of electric generators supplying said system, a driving motor for each such generator, an automatic speed responsive means for simultaneously and similarly controlling the speeds of all of said motors.

2. An electric distribution system, a plurality of electric generators supplying said system, a driving motor for each such generator and automatic means for simultaneously controlling the speeds of all of said motors so as to maintain the average speeds of each such motor equal to a predetermined average value independently of load.

3. An electric distribution system, a plurality of electric generators supplying said system, a driving motor for each such generator, high frequency signalling apparatus, and means for remotely controlling the speeds of said motors through the high frequency signaling apparatus.

4. An electric distribution system, a plurality of electric generators supplying said system, a driving motor for each such generator, a basic speed device, high frequency signalling apparatus, and automatic means responsive to such basic speed device for simultaneously controlling the speeds of said motors through the high frequency signaling apparatus.

5. An alternating current distribution system, a plurality of synchronous generators supplying said system, a motor for driving each such generator, means for measuring the average error in frequency of said system, and means controlled thereby for simultaneously controlling the speeds of said motors so as to maintain the average error in frequency at a negligible value.

6. An alternating current distribution system, a plurality of synchronous generators supplying said system, a motor for driving each such generator, and automatic means responsive to the average frequency of said system for controlling said motors so as to maintain the approximate load distribution between them in a desired relation.

7. An alternating current distribution system, a plurality of synchronous generators supplying said system, a motor for driving each such generator, means for measuring the average error in frequency of said system, and means controlled thereby for simultaneously controlling the speeds of said motors so as to maintain the average error in frequency at a negligible value and so as to maintain the approximate load distribution between said units in a desired relation.

8. An alternating current distribution system, a plurality of synchronous generators supplying said system, a motor for driving each such generator, automatic means for measuring the average error in frequency of said system, and means controlled thereby tending to maintain synchronism between said motors independently of the synchronizing effect of having the synchronous generators which are driven thereby connected to a common distribution system.

9. An alternating current distribution system, a plurality of synchronous generators supplying said system, a motor for driving each such generator, a speed governor for each of said motors, apparatus for measuring the average error in frequency of said system, and means responsive to such measurement for biasing the speed governors of each of said motors in a manner to correct for any such errors in frequency.

10. An alternating current distribution system, a plurality of synchronous generators supplying said system, a motor for driving each such generator, an automatic governor for each motor for keeping the speed thereof at a substantially constant value, an accurately adjusted time piece, an endless flexible member, means for driving said member in synchronism with the frequency of said system, means for causing said member to be advanced at another place in synchronism with the movement of said time piece, whereby the length of the member included between the places where it is being advanced by said two latter means is a function of the variation in frequency of said system, and means controlled by said member in accordance with such variations in length for biasing the governors of all of said motors to correct for said variations in frequency.

11. An alternating current distribution system, a plurality of synchronous generators supplying said system, a motor for driving each generator, a governor for each motor adapted to keep its speed at a substantially constant value, a differential master clock mechanism for continuously measuring the average deviation of the frequency of said system from normal, and means controlled by said mechanism and exerting forces proportional to the magnitude of said deviation at any instant for biasing the governors of said motors in a manner to reduce said deviation.

12. An alternating current distribution system, a plurality of synchronous generators supplying said system, a motor for driving each generator, a governor for each motor adapted to keep its speed at substantially constant value, a differential master clock mechanism for measuring the average error in the frequency of said system, and means controlled by said mechanism adapted to bias said governors to positions to correct for said error, the biasing forces being proportional to said error and responsive to speed variations of said motors which are too small to effect the normal operation of said governors.

13. An alternating current distribution system, a plurality of synchronous generators supplying said system at remote points, a motor for driving each such generator, a centrifugal speed governor for each motor adapted to keep its speed at a substantially constant normal value, a differential master clock mechanism for measuring the average error in frequency of said distribution system, high frequency signal sending apparatus controlled thereby in accordance with such errors in frequency, high frequency signal receiving apparatus associated with the motors at the remote points, and means controlled thereby in response to signals sent out by said high frequency signal sending apparatus for modifying the normal operation of said centrifugal governors in a manner as to correct for such errors in the frequency of said system.

14. An alternating current distribution system, a synchronous electric generating unit supplying said system, means for measuring the average error in frequency of said system, means for producing a high frequency signal sending current, means controlled by said frequency error measuring means for modulating such high frequency signal sending current in accordance with the direction and magnitude of the average frequency error, a high frequency receiving device responsive to such modulated signaling current, and means controlled by said receiving device for producing a controlling influence on the speed of said generating unit tending to correct the average frequency error.

15. In an electric distribution system, an electric generator supplying said system, a motor for driving said generator, a speed governor for maintaining the speed of said motor at approximately a predetermined value, means for modifying the action of said governor, an electric motor for controlling said governor modifying means, a high frequency signal receiving device having a plurality of vibratory reeds responsive to different signaling frequencies, a plurality of energizing circuits for said electric motor controlled by said reeds, each such circuit when energized corresponding to a different position of said motor, and means at a remote point for selectively producing high frequency signals having frequencies to which said vibratory reeds are responsive.

16. In an electric distribution system, an electric generating unit supplying said system, means for controlling the speed of said generating unit, a motor for influencing said speed controlling means, a high frequency signal receiving device for controlling the operation of said motor, and means at a remote point for transmitting high frequency signals to which said receiving device is responsive.

17. In an electric distribution system, an electric generator supplying said system, a motor for driving said generator, a speed governor for maintaining the speed of said motor at approximately a predetermined value, means for modifying the influence of said governor on the speed of said motor, an electric motor for controlling said modifying means, a high frequency signal receiving device for controlling the operation of said electric motor, and means at a remote point for transmitting high frequency signals to which said signal receiving device is responsive.

18. An alternating current distribution system, a synchronous electric generating unit supplying said system, a differential master clock mechanism for measuring the average error in frequency of said system, means controlled thereby for producing high frequency signals indicative of the direction and magnitude of said error, a high frequency signal receiving device responsive to said signals, and means controlled thereby for producing a controlling influence on the speed of said electric generating unit tending to correct for said error.

19. An alternating current distribution system subject to varying load, a differential master clock mechanism for measuring the average error in the frequency of said system, a plurality of synchronous electric generating units supplying said system at remote points, means controlled by said differential master clock mechanism for producing signals indicative of the direction and magnitude of the average frequency errors of said distribution system, signal receiving devices associated with each of said electric generating units, said receiving devices being responsive to the said signals, and means controlled by said signal receiving devices in response to the reception of said signals for maintaining a desired load distribution between said plurality of generating units.

20. An electric distribution system, a plurality of electric generating units supplying said system at remote points, means at one of said points for controlling the speed of the electric generating unit thereat, means controlled by said speed controlling means for producing high frequency carrier current signals in said electric distribution system, high frequency signal receiving means responsive to such signals connected to said system at another of said points, and means controlled thereby for controlling the speed of the electric generating unit at said last-mentioned point.

21. An electric distribution system, an electric generating unit supplying said system, means at a remote point for transmitting high frequency carrier current signals over said system, and means operated in response to said high frequency carrier current signals for controlling the speed of said electric generating unit.

22. An electric distribution system subject to varying load supplied at remote points by a plurality of electric generating units, means for individually adjusting the relative load supplied to said system by each of said units, and automatic means for thereafter maintaining the load distribution between said units substantially fixed in the relation to which it has been adjusted.

In witness whereof, I have hereunto set my hand this 26th day of May, 1926.

HENRY E. WARREN.